US011127055B1

(12) United States Patent
Davis (10) Patent No.: US 11,127,055 B1
(45) Date of Patent: Sep. 21, 2021

(54) SYSTEM AND METHOD FOR NAVIGATING AN AUTOMATED PROCESS USING AUDIO AND TACTILE FEEDBACK

(71) Applicant: STATE FARM MUTUAL AUTOMOBILE INSURANCE COMPANY, Bloomington, IL (US)

(72) Inventor: Timothy Joel Davis, Warrenville, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 692 days.

(21) Appl. No.: 14/972,877

(22) Filed: Dec. 17, 2015

Related U.S. Application Data

(60) Provisional application No. 62/121,761, filed on Feb. 27, 2015.

(51) Int. Cl.
*G06Q 30/02* (2012.01)
*G10L 15/18* (2013.01)
*G10L 25/72* (2013.01)
*G10L 15/22* (2006.01)
*G06Q 30/00* (2012.01)

(52) U.S. Cl.
CPC ....... *G06Q 30/0282* (2013.01); *G06Q 30/016* (2013.01); *G10L 15/1822* (2013.01); *G10L 15/22* (2013.01); *G10L 25/72* (2013.01)

(58) Field of Classification Search
None
See application file for complete search history.

(56) References Cited

U.S. PATENT DOCUMENTS

| 9,911,435 | B1* | 3/2018 | Sugar | G10L 15/10 |
|---|---|---|---|---|
| 2003/0177140 | A1* | 9/2003 | Debard | G06F 8/34 |
| 2004/0030587 | A1* | 2/2004 | Danico | G06Q 40/02 |
| | | | | 705/4 |
| 2007/0021979 | A1* | 1/2007 | Cosentino | A61B 5/0031 |
| | | | | 705/2 |
| 2013/0097054 | A1* | 4/2013 | Breitenbach | G06Q 30/06 |
| | | | | 705/26.8 |

(Continued)

*Primary Examiner* — Jan P Mincarelli
(74) *Attorney, Agent, or Firm* — Marshall, Gerstein & Borun LLP (57) ABSTRACT

A computer-implemented method for navigating an automated process using audio and tactile feedback is presented. The method includes capturing conversational audio originating from a client computing device and extracting data elements from the conversational audio. The method include matching the extracted data elements to a set of predefined data categories and determining one or more remaining data categories from the set of predefined data categories to satisfy the requirements of a transaction type. The method further includes determining a next best question addressing at least one of the remaining data categories. In one embodiment, the method may relate to enhancing an online customer experience, and help a customer obtain a quote for insurance products, submit an insurance claim, and/or wirelessly communicate with an insurance provider via a mobile device to adjust or acquire insurance policies, such as auto, home, health, renters, or life insurance and/or acquire vehicle or home loans.

8 Claims, 5 Drawing Sheets

(56) References Cited

U.S. PATENT DOCUMENTS

2015/0324908 A1* 11/2015 Starikova ............... G06Q 40/02
 705/38
2016/0203002 A1* 7/2016 Kannan ............... G10L 15/1822
 715/708

* cited by examiner

SYSTEM AND METHOD FOR NAVIGATING AN AUTOMATED PROCESS USING AUDIO AND TACTILE FEEDBACK

RELATED APPLICATIONS

This application claims the benefit of U.S. Provisional Application No. 62/121,761, filed Feb. 27, 2015, which is incorporated by reference herein in its entirety.

TECHNICAL FIELD

The present disclosure generally relates to a system and method for using audio and/or tactile feedback to determine a next best question in an automated insurance process.

BACKGROUND

Many insurance carriers now offer online and mobile channel access to services and processes. These services and processes may be fairly linear in nature and are typically built upon a business-based definition of simplicity, where a series of products are presented for selection and a linear series of questions are asked to capture required information for purchasing the products.

BRIEF SUMMARY

Traditional services and processes do not embody the human-based definition of simplicity, which, for some customers (and/or potential customers), may be more conversation-based. While fairly complex situations may be communicated verbally in a short time span, these same situations may take a much longer period of time to express using a linear web and/or form-based process, if the situation can be expressed at all. Even after the customer thinks the transaction is complete, underwriters, agents and/or other human actors may still need to sort out the details from the information that the customer entered.

The prevalence of handheld devices offers a dual opportunity: the capability to capture and evaluate the spoken word (in a sequence that makes sense to them, not pre-determined by the system), and the capability to capture customer responses through simple gestures. In one embodiment, the present embodiments may enhance an online customer experience, such as making the experience quicker and/or more intuitive. The customer may wirelessly communicate with an insurance provider remote server using their mobile device. The insurance provider may provide the customer with an insurance quote, allow the customer to update or adjust one or more insurance policies (such as update customer information, insured items, discounts, premiums, etc.), purchase insurance, and/or submit an insurance claim. The insurance policies may be auto, home, life, health, renters, pet, and/or other types of insurance. Other products offered to the customer may be home or vehicle loans or loan quotes.

In one aspect, a computer implemented method for navigating an automated process using audio and tactile feedback may be provided. The method may include (1) capturing, by one or more processors, one or more selections of conversational audio originating from a client computing device and/or (2) extracting, by the one or more processors, one or more data elements from the one or more selections of conversational audio. The method may also include (3) matching, by the one or more processors, the one or more extracted data elements to a set of predefined data categories and/or (4) determining, by the one or more processors, one or more remaining data categories from the set of predefined data categories to satisfy the requirements of a transaction type. The method may further include (5) determining a next best question, wherein the next best question addresses at least one of the remaining data categories. As a result, an online customer experience may be enhanced. The method may include additional, fewer, or alternate actions, including those discussed elsewhere herein.

A computer system for navigating an automated process using audio and tactile feedback may be provided. The system may include an audio engine configured to extract one or more data elements from captured conversation audio and match the one or more data elements to one or more predefined data categories required to satisfy a transaction type, wherein the conversational audio may originate from a client computing device and a data element engine configured to determine, based upon the matched data categories, one or more remaining data categories to satisfy the requirements of the transaction type and a next best question for retrieving information relevant to addressing at least one of the remaining data categories. As a result, enhancing an online customer experience is facilitated. The system may include additional, less, or alternate functionality, including that discussed elsewhere herein.

Additional advantages will become apparent to those of ordinary skill in the art from the following description.

BRIEF DESCRIPTION OF THE DRAWINGS

There are shown in the drawings exemplary aspects of the present disclosure.

The figures depict a preferred embodiment of the present invention for purposes of illustration only. One of ordinary skill in the art will readily recognize from the following discussion that alternative embodiments of the structures and methods illustrated herein may be employed without departing from the principles of the invention described herein.

DETAILED DESCRIPTION

The present embodiments relate to, inter alia, capturing conversational audio and/or physical gestures as input from customers, while providing audio and/or visual output and further prompts for customer action in the form of audio questions and visual messaging. An initial conversational audio from a customer may become the basis for establishing the transaction type the customer is trying to perform, as well as determining and collecting the necessary information for that transaction—though in a non-linear manner.

In this manner, the customer may give as much or as little initial conversational input as they choose, and the application may use that set of information to establish the appropriate next steps, such as selecting the best possible follow-up questions (either audio or visual) in order to identify the right process or continue down a process path already identified. Follow-up questions may take into account the set of information provided so far and then apply artificial intelligence to deduce the appropriate follow-up response. These follow-up questions may be of several types, depending on the level of confidence within the application of the customer's desired course of action (the customer job).

Because information is collected in a non-linear fashion, certain information may be missing and/or require confirmation. Accordingly, in some aspects the system may selectively posit specific selections to the customer, prompting them to perform some action (such as "tap to confirm" and/or "swipe to choose [between two options]").

The present embodiments may ask a potential or existing customer several types of general questions or prompts for information (using either audio or video). For instance, one exemplary general question or prompt may be: "Tell me about what you'd like to do today," which may be used to establish a general realm of activity or desired transaction (get quote, add a car or driver to a policy, change policy or customer information, submit claim, etc.). Other exemplary general questions or prompts may include "Tell me about yourself," "Tell me about your home," "Tell me about where you (are going to) live," and/or other questions.

The present embodiments may further present more specific questions or prompts. One exemplary specific prompt may be "Tell me about your kitchen," which may lead to multiple data elements being pieced together to establish the relative replacement cost value of that part of the house (economy, standard, nice, over-the-top, etc.). Other exemplary specific prompts may include "How many people are living in the house besides you and your wife?"; "About how many miles do you drive every year?" and/or other prompts or questions.

The present embodiments may further include the ability of the user to quickly confirm items. The confirmation of items may be performed via a tap or swipe on a display screen of a mobile device to confirm. Confirmations may relate to: "Which address is correct?"; "Do you want a defaulted or customized set of coverages?"; "Continue or wrap up for now?", which may then save data associated with the customer interaction and/or send the data to an insurance representative or agent, if desired.

The specific questions asked may be limited to a sub-set of an overall question set of a given virtual form. For example, the user's first soliloquy may establish their chosen job, and 30 out of a total of 50 required data elements (answers to application questions) to complete that job. The remaining 20 data elements may be gathered by asking general questions (to attempt to gather the majority of the 20 data elements or answers in the most natural way for the user) and then whatever miscellaneous, specific questions needed (to capture single data elements). Any question (general or specific) may be asked by the application in audio or visual formats (or both at once). Thus, a general question such as "What type of house are you buying?" may be asked in audio form, and populated on the screen (with no actionable gestured responses offered).

The mobile device itself may also be used to help establish (and limit) the options available to a given user, as well as to pre-fill certain virtual forms with existing information. For example, the fact of access from a given mobile device may be used to establish a so-called "Level of Assurance" for subsequent transactions and access to information. Because of the association between a given mobile device and a given customer, existing customer record information may be pre-filled, and certain processes may be made available or customized as a result. For example, an existing residential fire insurance customer, when asking for a quote for insurance covering a new house, may reasonably be asked whether they are moving or buying a second home—whereas a customer without an existing residential policy with the insurance provider may not be asked the same thing, necessarily. Information captured in this type of process may be needed to be held in "limbo" in certain instances—either because of imperfect audio input, or because of incomplete information.

With the present embodiments, certain data elements be confirmed and others may be assumptions. The confirmations may be given more weight than the assumptions. For instance, five assumptions (or hints) may equal two confirmed responses, for example.

The following scenarios provide examples. For a new homeowners insurance quote, the audio input may be: "Hi, this is John Smith. My wife Jane and I are buying a new house in April, and I'd like to get a quote." From the audio input, a number of data elements may be established: (1) transaction type (quote) and/or insurance type (homeowners); (2) primary applicant name (John Smith); (3) added applicant name (Jane Smith); (4) marital status (married); (5) approximate effective date (April). Other data elements may at least be narrowed, such as a different risk location address compared to the customer's existing insured property may be assumed. The data elements determined or approximated may lead to having sufficient information to present a reasonably accurate quote to the customer. The quote may be based in part on the policy type, number of residents (tentative: two or more), use, number of units, and/or the home being a primary or secondary residence, but not a multi-unit home.

A basis for a primary applicant Customer Record search may be provided. The search engine may correlate a name with a phone number during the customer search. If no one is found or identified by the search, the search engine may correlate an area code for a general region. The search engine may also search for and/or assign an agent or representative based upon this combination, and/or create a new customer record.

The search engine may verify a customer's identity later in process, such as based upon additional information. In one aspect, a user interface on the customer's mobile device may present a tappable set of options, which may include certain questions, such as: "Is this you?" along with a mailing address.

In the Added Car scenario, the audio input from the customer may be: "I just bought a new car and would like to add it to my policy." The method may then establish various process and/or determine certain data elements from the audio input, such as transaction type (adding a vehicle to an auto insurance policy) and/or an effective date (such as today or slightly backdated). The method may also present prompts to acquire or confirm a vehicle type; number of drivers; usage type; ownership or lienholder information; amount of coverage, deductibles, or other limits; and/or other data elements. The method may include matching a phone number or PIN of an existing customer record to fill in other information in an application, such as mailing and billing address. With respect to billing information, a confirmation question may be presented related to: "No changes to other policies or contact information?"

The present embodiments, may include (1) integrating audio and gesture input, with audio and visual output to quickly guide a user into and through a desired process in fewer (formal) steps than previously required; (2) collapsing required supplemental questions as an entire set as information is captured (rather than in a linear fashion, based upon single responses); (3) the use of tentatively accepted or assumed data to establish likely next steps; and/or (4) rapid transfers: an option to "tap to call your Agent" if the process hits a dead end, with all information (audio and gestures, in raw form and translated into data elements) available to the agent or other sales associate.

In addition to providing insurance-related products or services, the present embodiments may facilitate completing applications (and/or receiving quotes/terms) for vehicle or home loans, or other financial products. The prompts may relate to gathering sufficient data elements regarding a vehicle or a house, and their respective type or features, to provide a quote for potential financing or loans. The prompts may also relate to gathering sufficient data elements regarding the customer's employment and/or finances. Other prompts may be provided.

I. Exemplary System Architecture

Figure 1:
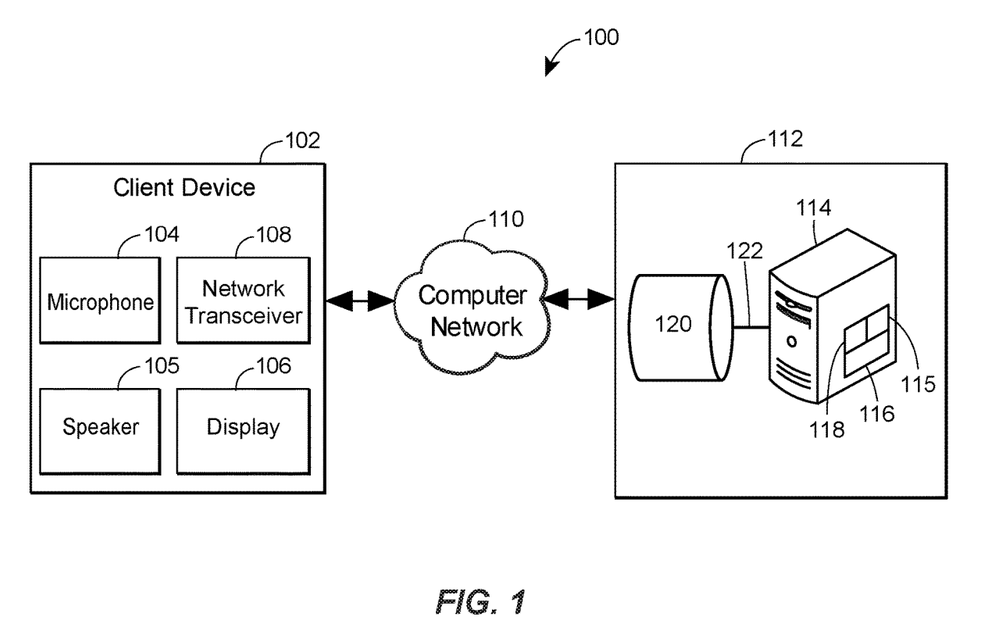
FIG. 1 is a simplified and exemplary block diagram of a system and method for navigating an automated process using audio and tactile feedback.

FIG. 1 illustrates various aspects of an exemplary architecture of a system for navigating an automated process using audio and tactile feedback 100. The high-level architecture may include both hardware and software applications, as well as various data communications channels for communicating data between the various hardware and software components. The system for navigating an automated process using audio and tactile feedback 100 may include various software and hardware components, modules and/or engines that may employ one or more methods described herein. The various components, modules and/or engines may be implemented as computer-readable storage memories containing computer-readable instructions (i.e., software) for execution by a processor of the system for navigating an automated process using audio and tactile feedback 100.

A. Exemplary Front End Components

The system for acquisition and policy change integrating audio and tactile feedback 100 may include front end components, including a computing device 102 that may execute instructions for executing an application, receiving audio and tactile feedback, extracting data elements from the received feedback, etc. The computing device 102 may be a personal computer, a mobile device (e.g., smart phone, tablet computer, notebook, netbook, laptop, phablet, smart watch or bracelet, wearable electronics, smart glasses, etc.), or other suitable computing device or mobile device. Those of ordinary skill in the art will recognize that the present system may be used in a dedicated application, a web application, a combination thereof, etc. The computing device 102 may be a client device or a client computing device.

The computing device 102 may include one or more microphones 104 that may be used for receiving audio feedback from a user (such as a customer and/or potential customer) of the client device. The computing device 102 may also include one or more speakers 105 that may be used for providing audio guidance, such as a questions relating to acquisition and policy change. The computing device 102 may also include one or more displays 106 that may be used for presenting data to a user, such as a confirmation of one or more data elements. In some aspects, the display 106 may be a touch screen capable of receiving tactile feedback from the user, such as a selection.

In some aspects, the computing device 102 may include a network transceiver 108 for connecting to a computer network 110, such as the Internet or other type of suitable network (e.g., local area network (LAN), a metropolitan area network (MAN), a wide area network (WAN), a mobile, a wired or wireless network, a private network, a virtual private network, etc.). The computing device 102 may connect to back end components 112 via the computer network 110, such as via wired or wireless communication, including radio frequency (RF) communication.

B. Exemplary Back End Components

The back end components 112 may include a server 114 that may include one or more computer-executable instructions, components, modules or engines for determining when sensitive data is being accessed, transmitted, displayed, etc.

The server 114 may also include one or more modules 115, for executing computer-executable instructions performed for the system for acquisition and policy change integrating audio and tactile feedback 100. In some aspects, the server 114 may include one or more of a capture module, an extraction module, a matching module, a data category module and/or a next step module. For example, the capture module may be used to capture and/or receive one or more selections of conversational audio originating from the computing device 102. The extraction module may be used to extract one or more data elements from the one or more selections of conversational audio. The matching module may match the one or more data elements to a set of predefined data categories and the data category module may determine one or more remaining data categories from the set of predefined data categories to satisfy the requirements of a transaction type. The next step module may determine the next step of the system, such as, for example, a next best question, confirmation question, etc., for retrieving additional information relevant and/or required to satisfy the requirements of the remaining data elements for the transaction type.

In some aspects, the next step module may also determine if enough data has been collected to retrieve applicable third party data. The next step module may further retrieve third part data once the determination has been made. For example, after certain data has been captured and confirmed (such as an address), related third party may be retrieved, such as the characteristics of a building at the collected address from county records. Of course this is only one example and those having ordinary skill in the art will recognize that numerous types of data may be collected and/or retrieved from a variety of third party data sources.

The server may also include one or more engines for executing computer-executable instructions performed for the system for navigating an automated process using audio and tactile feedback 100, including an audio engine 116 and a data element engine 118.

For example, the audio engine 116 may receive captured conversational audio and extract one or more data elements from the captured conversation audio. The audio engine 116 may further match the one or more data elements to one or more data categories required to satisfy a transaction type.

The data element engine 118 may determine the number of data elements remaining for the transaction type based on the data categories matched by the audio engine. The data element engine 118 may further determine a next step, such as a next best question, confirmation question, etc., for retrieving additional information relevant and/or required to satisfy the requirements of the remaining data elements for the transaction type.

The back end components 112 may further include one or more databases 120. Each database 120 may include a data storage device, such as random-access memory (RAM), hard disk drive (HDD), flash memory, flash memory such as a solid state drive (SSD), etc. The back end components may communicate with each other through a communication network 122, such as a local area network or other type of suitable network (e.g., the Internet, a metropolitan area network (MAN), a wide area network (WAN), a mobile, a wired or wireless network, a private network, a virtual private network, etc.).

The exemplary system 100 shown in FIG. 1 may include additional, fewer, or alternate components, including those discussed elsewhere herein. Furthermore, although the modules 115 and the engines 116 and 118 are depicted and described as part of the back end components 112, those having ordinary skill in the art will appreciate that the modules 115 and/or the engines 116 and 118 may also be included in the computing device 102. In some aspects, the system for acquisition and policy change integrating audio and tactile feedback 100 may use a combination of the modules 120 and/or the engines 116 and 118 on both the computing device 102 and the data server 114.

II. Exemplary Flow Chart for Determining Next Best Step

Figure 2:
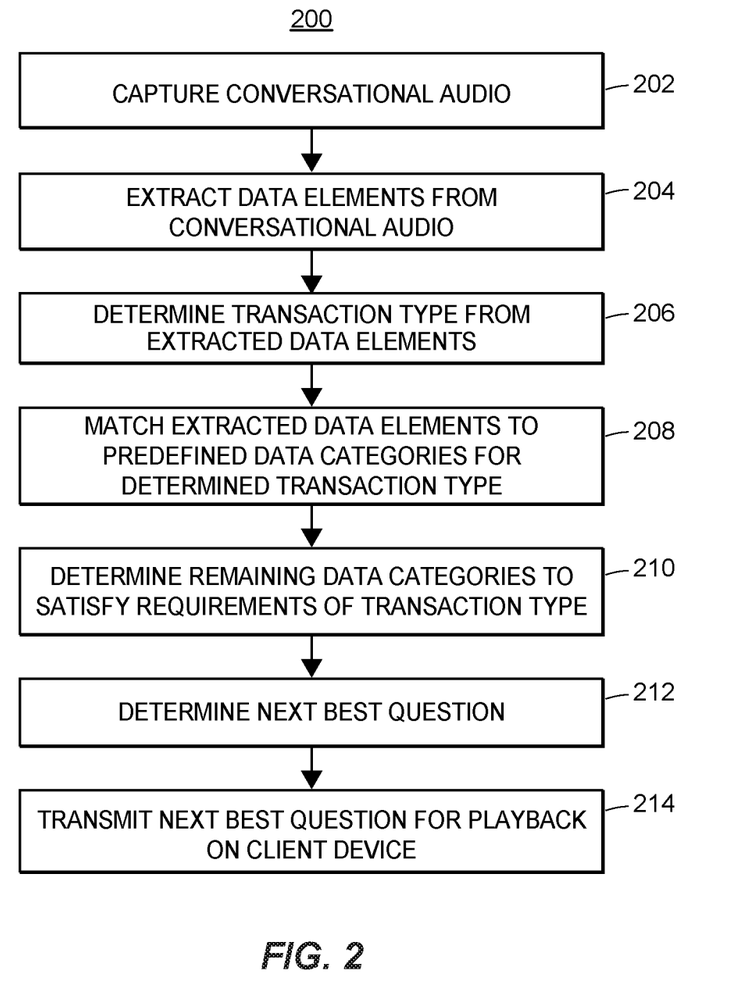
FIG. 2 is a flow chart illustrating an exemplary method for determining next best step in an automated insurance process.

FIG. 2 is a high level flow chart of an exemplary method, routine or process 200 for determining a next best step in an application for acquisition and policy change integrating audio and tactile feedback on a computing device. A user, such a customer and/or potential customer of an insurance company and/or a holder of an insurance policy, a beneficiary of an insurance policy, a claimant, an insurance agent associated with the company or some other employee or independent contractor affiliated with the company, may use a client device, such as the computing device 102 illustrated in FIG. 1, to access an integrated audio/tactile mobile application for acquisition and policy change process. For example, the application may be for purchasing or adjusting an insurance policy, receiving a quote for one or more insurance policies, and/or submitting an insurance claim. The application may be a native application, a web application hosted on one or more servers, such as the server 114, described in reference to FIG. 1, a combination of the two, etc.

The user may enter an input, via a mouse click, touch press, keyboard click, etc., to enable audio capture functionality. In some aspects, the user may also enter an input, via a mouse click, touch press, keyboard click, etc., representing one or more user credentials and the one or more user credentials may be received at the computing device. For example, the user credentials may be a customer name associated with a company account, a user name of the customer account, etc. In some aspects, the user may be a customer entering a user account credential. In some aspects, one or more processors of the computing device may also execute an instruction to verify the customer account credentials via the use of a password or other verification technique.

The processor may execute an instruction to provide audio instruction and/or guidance. In some aspects, instruction and/or guidance may be visually depicted on the display of the client device. For example, the audio and/or graphical instruction may be a general question, such as "tell me about your house," "tell me about what you'd like to do today," etc. In response, the user may provide an audio instruction, response, etc. The audio provided by the user may be captured by the client device (block 202), using, for example, the microphone 104 depicted in FIG. 1. For example, the audio provided by the user may be "Hi this is John Smith. My wife Jane and I are buying a new house in April and I'd like to get a quote." In some aspects, the user may give an audio instruction before an audio instruction and/or guidance is provided by the client device.

The processor may also execute an instruction to extract data elements from the captured conversational audio (block 204). The data elements may be, for example, information used to answer insurance application questions. Sample data elements may include type of transaction (new price quote purchase, new price quote estimate, updated price quote, etc.), names (insured, family, spouse children, etc.), addresses (business, residential, rental, etc.), car (make and model, year, miles on car, miles driven daily, etc.), types of insured objects and condition of insured objects (description of kitchen appliances in an insured house, furniture, etc.). The processor may further execute an instruction to determine a transaction type from the extracted data elements (block 206).

Turning to the previous example listed above, the captured conversational audio may be "Hi this is John Smith. My Wife Jane and I are buying a new house in April and I'd like to get a quote." Example data elements that may be extracted from this conversational audio may include: (1) John Smith (2) Jane Smith (3) Wife (4) purchase house (5) April (6) quote. The processor may also execute an instruction to match the specific extracted data elements to the general predefined data categories (block 208). For example, using the examples described above the following extracted data elements may be matched to the following data categories: (1) primary applicant name (John Smith) (2) transaction type (quote for house insurance) (3) added applicant name (Wife Jane Smith) (4) marital status (Married) (5) number of residents (two) and/or (6) effective date (April).

The processor may further execute an instruction to determine the number of remaining data categories and/or type of data categories needed to satisfy the requirement of the transaction type (block 210). In some aspects, the processor executing the instruction may determine the number and type of remaining data categories based upon the data categories already matched and the determined transaction type. As established in the example scenario above, the user's initial audio capture might establish their chosen transaction type as a quote for homeowner's insurance, and 6 data elements out of a total of 10 required data elements (answers to application questions) to complete that job. For example, the 10 required data elements may include (1) primary applicant name, (2) transaction type, (3) added applicant name, (4) marital status, (5) number of residents, (6) effective date (7) use, (8) address, (9) type of furniture, and/or (10) square footage. Of course, this is a simplified example and those having ordinary skill in the art will appreciate that other transaction types and number of required data elements may be used.

The processor may also execute an instruction to determine a next best question for presentation to the user (block 212) and present the next best question to the user (block 214). In some aspects, the next best question may address one or more of the required data elements of the transaction type. In some aspects, a variety of stock questions may exist that are flagged as relating to certain data elements. In particular, each question may be flagged as relating to more than one data element. The processor may execute an instruction to select the question that relates to the most remaining data categories needed to satisfy the requirement of the transaction type.

Turning again to the example referenced above, the remaining four data categories may be (7) use, (8) address, (9) type of furniture, and/or (10) square footage. Accordingly, the processor may execute an instruction to determine the next best question that addresses the most of the remaining data categories. For example, a question such as "tell me about your house," may potentially relate to more of the remaining data categories than "what are you going to be using the house for," which may only potentially address one of the remaining data categories.

III. Exemplary Flow Chart for Determining Confidence Level

In some aspects, one or more of the data elements and/or data categories may be tentative. In the above example, the number or residents and/or effective date may be tentative because only a partial answer has been derived. For example, although the number of residents has been extracted, it is possible that additional residents may be living in the purchases house, such as children, parents, friends, etc. Additionally, the effective date may be tentative because although it is known that the house will be purchased in April, an exact date has not yet been extracted. Accordingly, in some embodiments the processor may further execute one or more instructions for determining a confidence level and/or confirming certain data elements and/or data categories.

Figure 3:
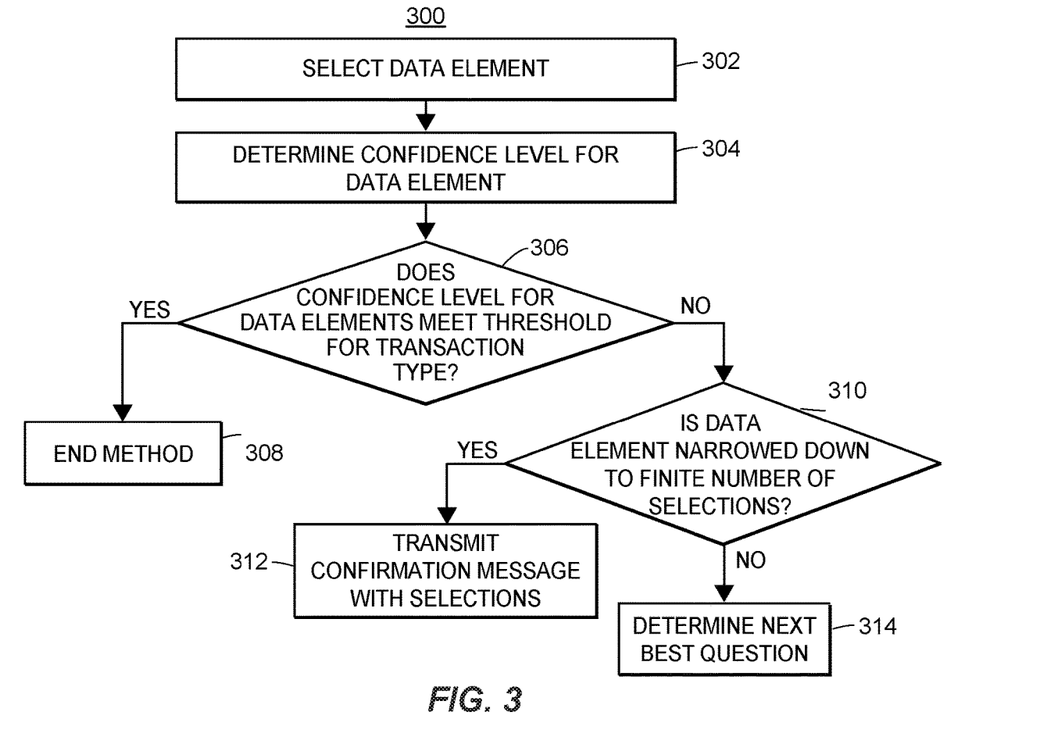
FIG. 3 is a flow chart illustrating an exemplary method for determining a confidence level for a data element.

FIG. 3 is a high level flow chart of an exemplary method, routine or process 300 for determining a confidence level for a data element retrieved in an application for acquisition and policy change integrating audio and tactile feedback on a computing device. In some aspects, one or more data elements may be captured by a processor executing one or more methods, such as the method 200 described above. However, the captured information may be incomplete due to missing information, imperfect audio, etc.

The processor may execute an instruction to select a data element (block 302) and determine the confidence level of the selected data element (block 304). In some aspects, one or more steps of the method 300 may be repeated for each data element. The processor may further execute an instruction to determine if the confidence level for the data element meets the threshold for the transaction type (block 306). In some aspects, the confidence level may vary based upon the transaction type. For example, more information or more detailed information may be needed for an actual purchase versus an initial quote. If the processor executing the instruction determines that the confidence level for the data element does meet the threshold for the transaction type (YES branch of block 306), the processor may end the method (block 308).

If the processor executing the instruction determines that the confidence level for the data element does not meet the threshold for the transaction type (NO branch of block 306), the processor may execute an instruction to determine if the data element has been narrowed down to a finite number of selections (block 310). If the processor determines that the data element is narrowed down to a finite number of selections (YES branch of block 310), the processor may further execute an instruction to transmit a confirmation message with the finite number of selections (block 312). If the processor executing the instruction determines that the data element has not been narrowed down to a finite number of selections (NO branch of block 310), the processor may execute an instruction to determine a next best question (block 314). In some aspects, the next best question may be selected to provide more information to increase the confidence level of the data element.

IV. Exemplary Interface for Presenting Potential Selections for Confirmation For example, in one aspect, a data element may be captured relating to the name of a customer's daughter. Due to audio problems, a processor executing one or more steps of the method 300 may determine that the data element relating to the daughter's name does not meet the threshold of the transaction type, but the data element is narrowed down to a finite number of selections: (1) Rosemarie and (2) Rosemary. Accordingly, the processor may execute an instruction to visually present the finite number of options via the screen.

Figure 4A:
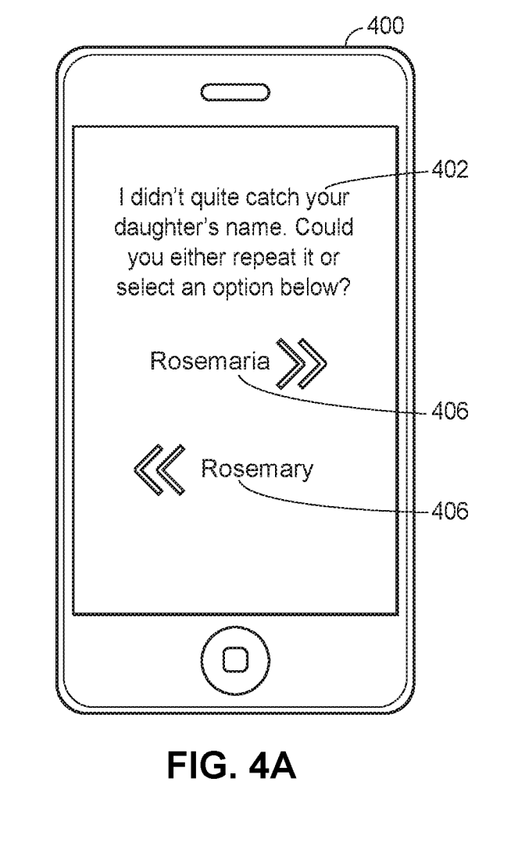
FIG. 4A is an exemplary user interface for presenting a number of potential selections.

Turning briefly to FIG. 4A, an exemplary user interface screen for displaying a number of potential answers for a data element may be provided. The exemplary user interface screen 400 may include a question prompt 402, explaining the selections, as well as two or more potential selections 406, representing potential answers for the data element. Of course, this is just one exemplary user interface screen and those having ordinary skill the art will recognize that a variety of user interface screens presenting a variety of information may be used.

For example, the user interface screen may present a single selection and request confirmation (i.e., yes or no) from the user. Alternatively, more than two finite selections may be presented. In some embodiments, one or more images may be presented to the user representing one or more of the potential answers. For example, a user may select an image corresponding to the type and/or quality of furniture and/or appliances in a house.

Figure 4B:
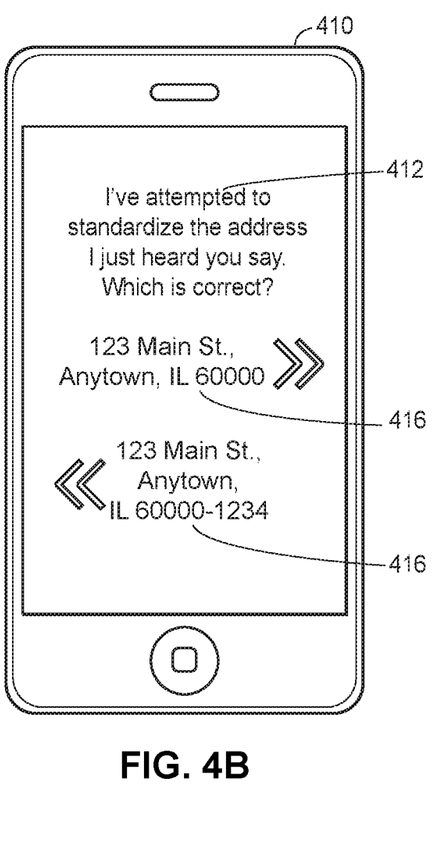
FIG. 4B is another exemplary user interface for presenting a number of potential selections.
Figure 4C:
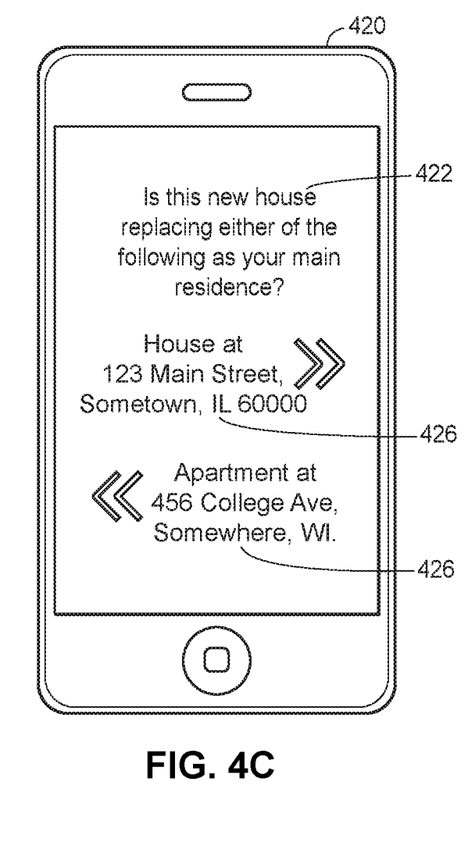
FIG. 4C is yet an exemplary user interface for presenting a number of potential selections.

As shown in FIG. 4A, the prompt or question for the customer may be "I didn't quite catch your daughter's name. Could you either repeat it or select an option below?" In other words, a prompt for either an audio or tactile (or screen operation) response may be provided. FIG. 4B illustrates another exemplary user interface screen 410. As shown in FIG. 4B another exemplary prompt 412 may include potential selections 416 such as "I've attempted to standardize the address I just heard you say. Which is correct? 123 Main St., Anytown, Ill. 60000 (or) 123 Main St., Anytown, Ill. 60000-1234." FIG. 4C illustrates yet another exemplary user interface screen 420. The exemplary user interface screen 420 depicts another exemplary prompt 422 which may include "Is this new house replacing either of the following as your main residence?" and one or more potential selections 426 such as "House at 123 Main Street, Sometown, Ill. or Apartment at 456 College Ave, Somewhere, Wis." Other prompts may be used to gather audio or tactile feedback or response from customers.

V. Exemplary Flow Chart for Extracting User Information

Figure 5:
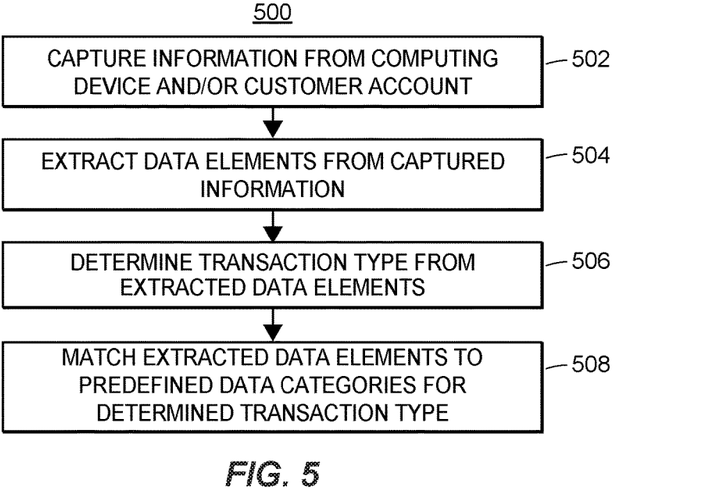
FIG. 5 is a flow chart illustrating an exemplary method for extracting one or more data elements from computing device information and/or user account information.

FIG. 5 is a high level flow chart of an exemplary method, routine or process 500 for extracting one or more data elements from computing device information and/or user account information. In some aspects, the computing device itself (such as the computing device 102 illustrated in FIG. 1) and/or one or more user accounts associated with the computing device may also be used to establish and/or limit the options available to a given user and/or to pre-fill certain virtual forms with existing information. In some aspects, the association between a given computing device and a given user may allow existing user record information to be pre-filled, and certain processes may be made available or customized as a result.

A processor may execute an instruction to capture information from a computing device and/or a user account associated with the computing device (block 502). The processor may also execute an instruction to extract one or more data elements from the captured information (block 504). As described above, the data elements may be, for example, information used to answer insurance application questions. Sample data elements may include names (insured, family, spouse children, etc.), addresses (business, residential, rental, etc.), and/or car (make and model, year, miles on car, miles driven daily, etc.). The processor may further execute an instruction to determine a transaction type (block 506) and to match one or more of the extracted data elements to one or more data categories required by a transaction type (block 508).

In some aspects, the extracted information may also be used to guide the next best question. For example, an existing residential fire insurance customer, when asking for a quote on a new house, might be asked whether they are moving or buying a second home—whereas a customer without an existing residential policy may not necessarily be asked the same questions.

VI. Exemplary Computing Device

Figure 6:
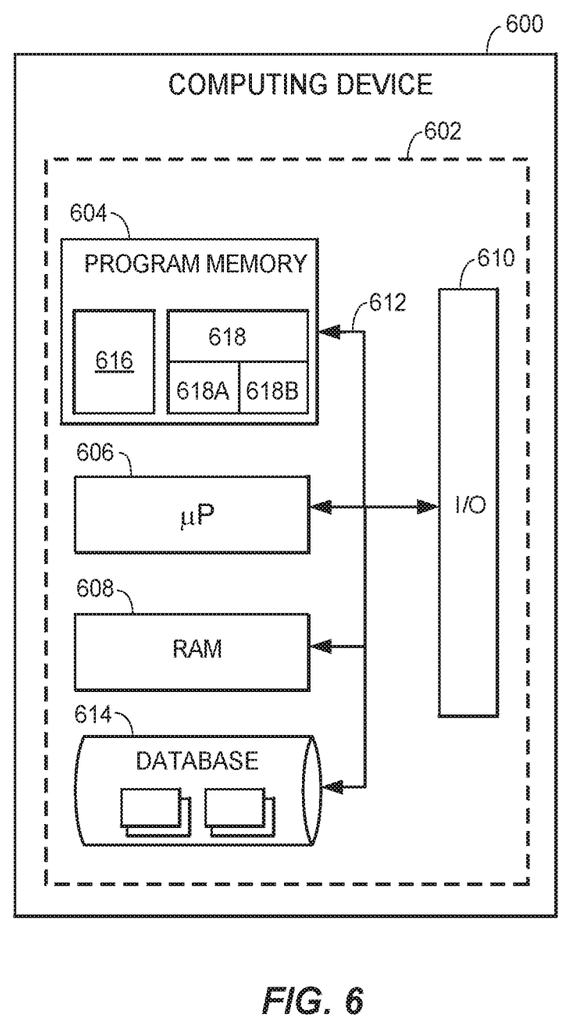
FIG. 6 is an exemplary architecture of a computing device.

Referring now to FIG. 6, a computing device 600 may include a controller 602. Exemplary computing devices may include the computing device 102 and/or the server 114 illustrated in FIG. 1. The controller 602 may include a program memory 604, a microcontroller or a microprocessor (μP) 606, a random-access memory (RAM) 608, and/or an input/output (I/O) circuit 610, all of which may be interconnected via an address/data bus 612. The program memory 604 may store computer-executable instructions, which may be executed by the microprocessor 606. In one aspect, the controller 602 may also include, or otherwise be communicatively connected to, a database 614 or other data storage mechanism (e.g., one or more hard disk drives, optical storage drives, solid state storage devices, etc.).

It should be appreciated that although FIG. 6 depicts only one microprocessor 606, the controller 602 may include multiple microprocessors 606. Similarly, the memory 604 of the controller 602 may include multiple RAMs 616 and multiple program memories 618, 618A and 618B storing one or more corresponding application modules, according to the controller's particular configuration. The computing device 600 may also include specific routines to be performed by the computing device 600.

Although FIG. 6 depicts the I/O circuit 610 as a single block, the I/O circuit 610 may include a number of different types of I/O circuits (not depicted). The RAM(s) 608, 616 and the program memories 604, 618, 618A and 618B may be implemented in a known form of computer storage media, including but not limited to, semiconductor memories, magnetically readable memories, and/or optically readable memories, for example, but does not include transitory media such as carrier waves. The computing device 600 may include additional, fewer, or alternate components, including those discussed elsewhere herein.

VII. Exemplary Computer-Implemented Method

A computer-implemented method that enhances an online customer experience may be provided. The method may include capturing, by one or more processors, one or more selections of conversational audio originating from a client computing device and/or extracting, by the one or more processors, one or more data elements from the one or more selections of conversational audio. The method may include matching, by the one or more processors, the one or more extracted data elements to a set of predefined data categories and determining, by the one or more processors, one or more remaining data categories from the set of predefined data categories to satisfy the requirements of a transaction type. The method may also include determining, by the one or more processors, a next best question, wherein the next best question addresses at least one of the remaining data categories.

In some aspects, the above method may further include determining, by the one or more processors, one or more data elements based upon user account information linked to the client computing device. In some aspects, the above method may further comprise determining, by the one or more processors, the transaction type based upon the one or more extracted data elements. In some aspects, the above method may further comprise determining, by the one or more processors, a confidence level for each of the extracted data elements. In some aspects, the above method may further include determining, based upon the requirements of the transaction type, a necessary confidence level for each of the extracted data elements required by the transaction type. In some aspects, the above method may further include determining, by the one or more processors, that a finite number of possible selections have been determined for a first data element from the one or more extracted data elements. In some aspects, the above method may further include providing the finite number of possible selections for display on the client computing device for confirmation by a user of the client computing device.

VIII. Exemplary Systems

A computer system that enhances an online customer experience may be provided. The system may include an audio engine configured to extract one or more data elements from captured conversation audio and match the one or more data elements to one or more predefined data categories required to satisfy a transaction type, wherein the conversational audio may originate from a client computing device and a data element engine configured to determine, based upon the matched data categories, one or more remaining data categories to satisfy the requirements of the transaction type and a next best question for retrieving information relevant to addressing at least one of the remaining data categories.

In some aspects, the above system may further include a user account engine configured to determine one or more data elements based upon user account information linked to the client computing device.

In some aspects the data element engine may be further configured to determine the transaction type based upon the one or more extracted data elements. In some aspects, the above system may further include a confidence engine that is configured to determine a confidence level for each of the extracted data elements. In some aspects the confidence engine may further be configured to determine, based upon the requirements of the transaction type, a necessary confidence level for each of the extracted data elements required by the transaction type. In some aspects, the above system may further include a selection engine configured to determine that a finite number of possible selections have been determined for a first data element from the one or more extracted data elements. In some aspects the confidence engine may further be configured to provide the finite number of possible selections for display on the client computing device for confirmation by a user of the client computing device.

A computer readable storage medium may include non-transitory computer readable instructions stored thereon for deploying application environments, the instructions when executed on one or more processors may cause the one or more processors to extract one or more data elements from the one or more selections of conversational audio, and/or match the one or more extracted data elements to a set of predefined data categories. The instructions when executed on one or more processors may cause the one or more processors to determine one or more remaining data categories from the set of predefined data categories to satisfy the requirements of a transaction type and determine a next best question, wherein the next best question addresses at least one of the remaining data categories.

In some aspects the computer readable storage medium may comprise further instructions stored thereon that may cause the one or more processors to determine one or more data elements based upon user account information linked to the client computing device. In some aspects the computer readable storage medium may comprise further instructions stored thereon that may cause the one or more processors to determine the transaction type based upon the one or more extracted data elements. In some aspects the computer readable storage medium may comprise further instructions stored thereon that may cause the one or more processors to determine a confidence level for each of the extracted data elements. In some aspects the computer readable storage medium may comprise further instructions stored thereon that may cause the one or more processors to determine, based upon the requirements of the transaction type, a necessary confidence level for each of the extracted data elements required by the transaction type. In some aspects the computer readable storage medium may comprise further instructions stored thereon that cause the one or more processors to determine that a finite number of possible selections have been determined for a first data element from the one or more extracted data elements. In some aspects the computer readable storage medium may comprise further instructions stored thereon that may cause the one or more processors to provide the finite number of possible selections for display on the client computing device for confirmation by a user of the client computing device.

IX. Additional Exemplary Computer-Implemented Method

In one aspect, a computer-implemented method of providing an integrated audio and mobile application for an insurance policy (or financial product) acquisition and change may be provided. The method may include (1) presenting, via one or more processors, a general prompt (either audio or visual) to a customer via their mobile device, the general prompt intended to elicit a response from the customer indicating a desired transaction that they would like to presently complete; (2) receiving or capturing, via the one or more processors, an audio, text, or other response from the customer; (3) parsing the response, via the one or more processors, to determine the desired transaction; (4) determining, via the one or more processors, one or more current data elements associated with, or needed to, complete the desired transaction from (i) parsing the response, and/or (ii) from customer information stored in a customer record or database; (5) determining, via the one or more processors, one or more missing data elements associated with, or needed to, complete the desired transaction (such as via comparing a list of necessary data elements with the one or more current data elements); and/or (6) presenting, via the one or more processors, audio or visual prompts via the customer's mobile device that elicit responses from the customer and/or lead to gathering the missing data elements from the customer to facilitate completing the desired transaction in an expedited manner.

The method may include additional, fewer, or alternative actions, including those discussed elsewhere herein. For instance, the desired transaction may be receiving a quote for auto, home, renters, health, or life insurance, or terms associated with a loan. The one or more current or missing data elements may include type of vehicle or vehicle features, and/or a location or address of a house or home features.

The audio or visual prompts intended to elicit responses from the customer and/or lead to gathering the missing data elements from the customer may be presented one at a time and in a next best question order, the next best question being determined via the one or more processors based upon a number of factors, such as type of desired transaction and/or type of insurance. The audio or visual prompts intended to elicit responses from the customer and/or lead to gathering the missing data elements from the customer may be confirmation questions or prompts. Additionally or alternatively, the audio or visual prompts intended to elicit responses from the customer and/or lead to gathering the missing data elements from the customer may present two options on a display screen of the customer's mobile device for them to select a correct or confirmed data element from (such as correct or confirm a name, address, "This John Smith?," vehicle, home, etc.).

X. Additional Considerations

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the computing device 102, the server 114, or any combination of computing devices within the system 100). The routines may be included as part of any of the modules described in relation to FIG. 1 or 6 or as part of a module that is external to the system illustrated by FIGS. 1 and 6. For example, the methods may be part of a browser application or an application running on the computing device 102 as a plug-in or other module of the browser application. Further, the methods may be employed as "software-as-a-service" to provide a computing device 102 with access to the system 100.

Additionally, certain aspects are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Although the text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments may be implemented, using either current technology or technology developed after the filing date of this patent, which would still fall within the scope of the claims.

Upon reading this disclosure, those of skill in the art will appreciate still additional alternative structural and functional designs for system and method for central administration of multiple application environments. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

To the extent that any meaning or definition of a term in this document conflicts with any meaning or definition of the same term in a document incorporated by reference, the meaning or definition assigned to that term in this document shall govern. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The patent claims at the end of this patent application are not intended to be construed under 35 U.S.C. § 112(f) unless traditional means-plus-function language is expressly recited, such as "means for" or "step for" language being explicitly recited in the claim(s).

The invention claimed is:

1. A computer-implemented method that uses audio and tactile feedback during an online customer experience, the method comprising:
    capturing, by one or more processors, one or more selections of conversational audio originating from a client computing device;
    extracting, by the one or more processors, one or more data elements from the one or more selections of conversational audio;
    determining, by the one or more processors, a transaction type based upon at least one of the one or more data elements;
    matching, by the one or more processors, at least one of the one or more extracted data elements to one or more data categories of a set of predefined data categories associated with the transaction type;
    determining, by the one or more processors, a first plurality of remaining data categories from the set of predefined data categories for which data is needed to satisfy the requirements of the transaction type;
    pre-filling at least one of the first plurality of remaining data categories for which data is needed from an account identified based upon the client computing device leaving a second plurality of remaining data categories for which data is needed;
    determining, by the one or more processors, a single next best question that knowingly addresses at least two of the second plurality of remaining data categories for which data is needed;
    causing, by the one or more processors, the single next best question to be presented to a user via the client computing device; and
    when at least two possible selections have been determined for a first data element from the one or more extracted data elements, providing, by the one or more processors, the possible selections for display on the client computing device for selection by a user of the client computing device.

2. The method of claim 1, further comprising:
    determining, by the one or more processors, the one or more data elements based upon user account information linked to the client computing device.

3. The method of claim 1, further comprising:
    determining, by the one or more processors, a confidence level for each of the extracted data elements.

4. The method of claim 3, further comprising:
    determining, based upon the requirements of the transaction type, a necessary confidence level for each of the extracted data elements required by the transaction type.

5. A computer system for using audio and tactile feedback to enhance an online customer experience, the system comprising:
    an audio engine, comprising computer-readable instructions executed by one or more processors of the computer system, configured to: extract one or more data elements from captured conversation audio, determine a transaction type based upon at least one of the one or more data elements, and match at least one of the one or more data elements to one or more predefined data categories of a set of predefined data categories required to satisfy the transaction type, wherein the conversational audio originates from a client computing device;
    a data element engine, comprising computer-readable instructions executed by the one or more processors of the computer system, configured to:
        determine, based upon the matched data categories, a first plurality of remaining data categories of the set of predefined data categories for which data is needed to satisfy the requirements of the transaction type,
        pre-fill at least one of the first plurality of remaining data categories for which data is needed from an account identified based upon the client computing device leaving a second plurality of remaining data categories for which data is needed, and
        determine a single next best question structured for retrieving information relevant to addressing at least two of the second plurality of remaining data categories for which data is needed to facilitate enhancing an online customer experience;
    a selection engine, comprising computer-readable instructions executed by the one or more processors of the computer system, configured to determine that at least two possible selections have been determined for a first data element from the one or more extracted data elements; and
    a communication channel for transmitting the single next best question to the client computing device to be presented to the user, and transmitting the at least two possible selections to the client computing device to be presented for selection by the user.

6. The system of claim 5, further comprising:
    a user account engine, comprising computer-readable instructions executed by the one or more processors of the computer system, configured to determine one or more data elements based upon user account information linked to the client computing device.

7. The system of claim 5, further comprising:
    a confidence engine, comprising computer-readable instructions executed by the one or more processors of the computer system, configured to determine a confidence level for each of the extracted data elements.

8. The system of claim 7, wherein the confidence engine is further configured to determine, based upon the requirements of the transaction type, a necessary confidence level for each of the extracted data elements required by the transaction type.

* * * * *

UNITED STATES PATENT AND TRADEMARK OFFICE
CERTIFICATE OF CORRECTION

PATENT NO. : 11,127,055 B1
APPLICATION NO. : 14/972877
DATED : September 21, 2021
INVENTOR(S) : Timothy Joel Davis It is certified that error appears in the above-identified patent and that said Letters Patent is hereby corrected as shown below:

In the Claims

At Column 18, Line 10, "extract one or more data" should be at Line 11, before "elements" as a sub-point.

At Column 18, Line 11, "determine" should be at Line 12, before "a transaction" as a sub-point.

At Column 18, Line 13, "match at least one of the one" should be at Line 14, before "or more data" as a sub-point.

Signed and Sealed this
Tenth Day of May, 2022

Katherine Kelly Vidal
*Director of the United States Patent and Trademark Office*